T. C. LAWFORD.
DETACHABLE SHARE FOR THE TEETH OF CULTIVATOR AND SCARIFIER IMPLEMENTS.
APPLICATION FILED DEC. 3, 1917.

1,255,442. Patented Feb. 5, 1918.

INVENTOR:
THOMAS C. LAWFORD,
BY John O. Seifert
HIS ATTORNEY

UNITED STATES PATENT OFFICE.

THOMAS C. LAWFORD, OF CROYDON, VICTORIA, AUSTRALIA.

DETACHABLE SHARE FOR THE TEETH OF CULTIVATOR AND SCARIFIER IMPLEMENTS.

1,255,442.  Specification of Letters Patent.  Patented Feb. 5, 1918.

Application filed December 3, 1917. Serial No. 205,047.

*To all whom it may concern:*

Be it known that I, THOMAS CAREY LAWFORD, a subject of the King of Great Britain, residing at Hewish Road, Croydon, in the State of Victoria, Commonwealth of Australia, have invented new and useful Improvements in Detachable Shares for the Teeth of Cultivator and Scarifier Implements, of which the following is a specification.

This invention relates to a detachable share for agricultural implements and it has been devised in order to provide a simple and economically constructed share. For such implements it is highly efficient in cultivating the soil and cutting the roots of and raising all weeds to the surface of the soil.

The share is strong and durable in construction and is designed to pass through the soil with little friction thereby making an implement fitted with the same very light of draft. Moreover, the wearing parts of the shares can be readily detached when worn and replaced at a very low cost.

A share constructed in accordance with the present invention consists essentially of a cutting blade which is fitted detachably to the underside of the tine and a detachable wearing point or stem extending forwardly of the blade. The blade and the wearing point are secured rigidly to the tine by a bolt or the like.

The invention is particularly adaptable to spring tines of cultivators and scarifiers but it can be fitted to rigid tines.

In order that the invention may be readily understood reference will now be had to the accompanying sheet of explanatory drawings, wherein—

Figure 1:
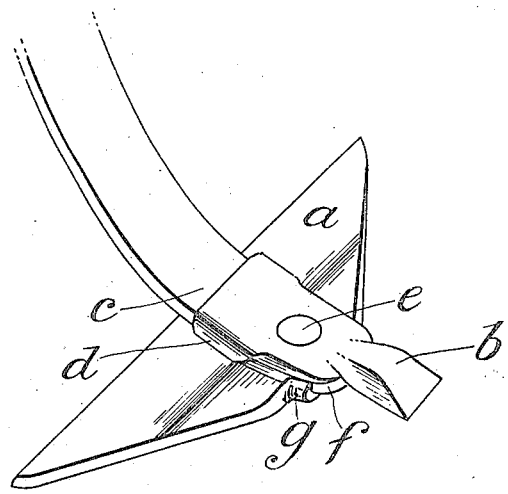
Figure 1 is a view in perspective of portion of a spring tine fitted with a share constructed in accordance with the invention.
Figure 2:
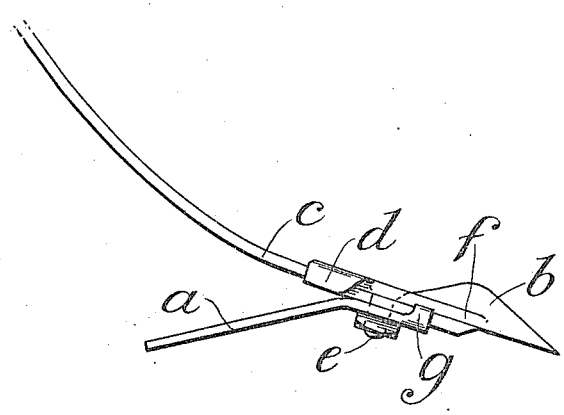
Fig. 2 is a view showing the invention in side elevation fitted to a tine.

In the drawings the reference letter $a$ designates the blade and the letter $b$ the wearing point of the share. The wearing point $b$ is preferably made of a short piece of flat spring steel and its rear end is shaped to lie flat upon the tine and its front end is rounded and pointed in an approved way. The rear end of the point $b$ is formed with depending side lugs $d$ which are adapted to fit against the sides of the tine.

The blade part $a$ is made of a flat piece of steel and is shaped with parallel front and rear edges and the front parallel edge is approximately the same width as the detachable wearing point.

The forward edge of the blade part and the wearing point are secured to the tine by means of a bolt $e$ which passes through the wearing point near the shoulder $f$ formed by rounding off or pointing the end thereof. The depending side lugs $d$ on the rear end of the wearing point $b$ prevent any lateral movement of the wearing point when the nut on the bolt $e$ is screwed up tightly.

The rear part of the blade $a$ is set more or less horizontally and its side edges preferably incline rearward and are sharpened to provide a good cutting edge.

The share is prevented from rocking on the tine by arranging the lower end of the latter to bear against the upper surface of the blade near the wearing point.

The wearing point can be removed readily when it is desired to re-sharpen the same and the blade can be easily removed and replaced by a new one when worn. The forward part of the blade $a$ in advance of the bolt is formed with two upstanding lugs $g$ which are adapted to bear against the sides of the tine and with the bolt $e$ effectually prevents any lateral movement of the blade when subjected to adverse strains in use.

The point of the share enters and passes freely through the soil and the blade portion formed by the second part cuts through the roots of all weeds and grass and prevents their growth.

The invention can be designed to suit different types of cultivators and scarifiers and in use will be found thoroughly efficient for the purposes for which it has been devised.

What I do claim is:—

1. A share for the tines of scarifiers, cultivators and the like implements comprising a detachable flat blade portion having upstanding lugs adapted to lie against the sides of a tine, and a detachable wearing point having its rear part shaped to conform to the upper surface of the tine and its front end sharpened to a cutting edge.

2. A share for the tines of scarifiers, cultivators and the like implements comprising in combination, a flat blade portion having a hole near its front edge, upstanding lugs on the blade in advance of the hole to embrace opposite sides of the tine, a wearing point having its rear end shaped to conform to the top of a tine and its front end sharpened, a hole in the rear part of the wearing point, and depending side lugs on the wearing point at the rear of the hole therein to embrace opposite sides of the tine.

3. In a share for the tines of scarifiers, cultivators and the like implements a flat blade portion having a hole near the front thereof and inclined cutting edges, and upstanding lugs in advance of the hole to embrace opposite sides of the tines.

4. In a share for the tines of scarifiers, cultivators and the like implements a wearing point having its rear end shaped to conform to and partially embrace the tine and its front end sharpened to a cutting edge, substantially as described and for the purposes herein set forth.

In testimony whereof I affix my signature in presence of two witnesses.

T. C. LAWFORD.

Witnesses:
ARTHUR G. L. NEIGHBOUR.
JAMES H. ANDERSON.

Copies of this patent may be obtained for five cents each, by addressing the "Commissioner of Patents, Washington, D. C."